INVENTOR
WARREN G. LAMBERT

ATTORNEY

INVENTOR
WARREN G. LAMBERT

BY Albert J. Kramer
ATTORNEY

United States Patent Office 3,453,873
Patented July 8, 1969

3,453,873
SHEAR STRAIN RESPONSIVE STRAIN GAUGE ELEMENTS AND CIRCUITS FOR UTILIZING SUCH ELEMENTS
Warren G. Lambert, 525 Aspen St., Morgantown, W. Va. 26505
Continuation-in-part of application Ser. No. 616,640, Feb. 16, 1967. This application Jan. 24, 1968, Ser. No. 704,978
Int. Cl. G01n 7/22
U.S. Cl. 73—88.5                                13 Claims

ABSTRACT OF THE DISCLOSURE

A shear strain responsive strain gauge is provided which includes a plurality of symmetrically disposed electrical resistance elements, located one in each quadrant of a Cartesian coordinate plane on an elastic base sheet. Each resistance element comprises a plurality of parallel legs of either arcuate or rectilinear configuration formed from a continuous resistance element such as foil or wire. The four resistance elements are connected in a Wheatstone bridge configuration to effect direct readout of shear strain in conventional use of the strain gauge. Other embodiments are provided which include additional resistance grids of parallel rectilinear configuration disposed along the respective orthogonally related axes of the coordinate plane. These additional grids combined with one or more of the quadrant oriented grids are also connected in a Wheatstone bridge configuration to effect direct readout of shear strain in conventional use of the strain gauge.

---

This invention relates to strain gauges of the variable electrical resistance type and more particularly to such strain gauges which are responsive to shear strain.

Shear strain is caused by stress that changes the right angle between the orthogonally related X and Y axes of an unstressed surface.

In the prior art, in order to measure shear strain, it has been necessary to utilize a plurality of variable resistance strain gauges or the like, arranged in predetermined patterns, to obtain linear strain measurements in three directions. These linear strains are then used as parameters with which to calculate the actual shear strain.

It is an object of this invention to provide a single strain gauge structure that is directly responsive to shear strain.

Another object of this invention is to provide a single strain gauge structure that is directly responsive to shear strain and circuits for such a strain gauge which provide a readout quantity directly proportional to shear strain.

Still another object of this invention is to provide single strain gauge structures that are responsive to both normal strains along the orthogonally related axes of a Cartesian coordinate plane as well as shear strain.

Still another object of this invention is to provide single strain gauge structures that are responsive to both normal strains along the orthogonally related axes of a Cartesian coordinate plane as well as shear strain, and circuits for such strain gauges which provide readout quantities directly proportional to the strains to which such gauges are subjected.

Yet another object of this invention is to provide a single variable resistance strain gauge structure which can be bonded or glued directly to the surface of a member prior to stressing the latter, to thereby provide a measurable change in electrical resistance which is a direct function of the shear strain to which the said surface is subjected when stress is applied to the member.

These and other objects of this invention will become more readily apparent with reference to the following specification and drawings which relate to several preferred embodiments of the invention.

Figure 1:
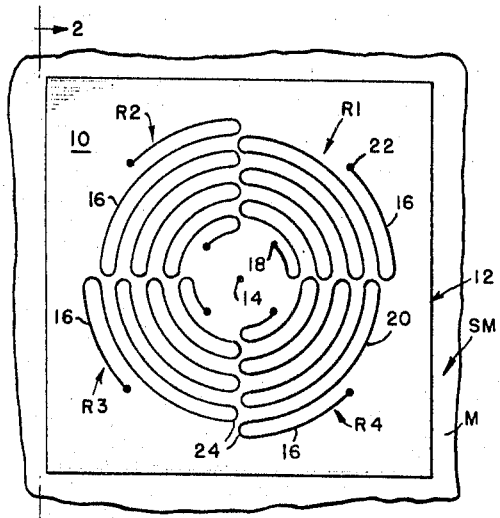
FIGURE 1 is a top plan view of a shear strain responsive strain gauge of the present invention applied to the surface of a member.
Figure 2:
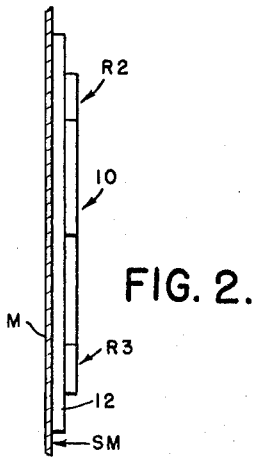
FIGURE 2 is a side elevation of the gauge of FIGURE 1, in partial cross section taken along the line 2—2 of FIGURE 1.

Referring in detail to the drawings, and in particular to FIGURES 1 and 2, a first embodiment of a shear strain responsive strain gauge 10 of the present invention is shown as including an elastic base member 12, in the form of a membrane or sheet of cloth, plastic, paper, or the like, on which are glued or bonded first, second, third and fourth resistance grids R1, R2, R3 and R4, respectively.

The resistance grids R1–R4 are each symmertically placed in a separate quadrant about a zero point or axial reference point 14 on the base member 12. The base member 12 is shown as gued or bonded to the surface SM of a member M which is to be subjected to stress. The shear strain at the surface SM can then be determined by the shear responsive strain gauge 10 as will be hereinafter more fully described.

Figure 3:
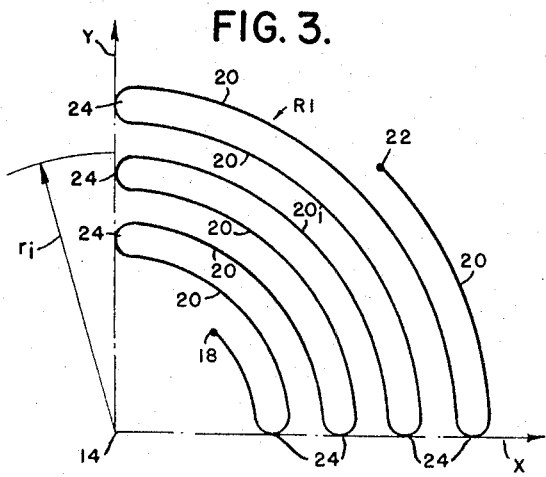
FIGURE 3 is a schematic illustration of a single quadrant resistance grid of the present invention.

Referring now to FIG. 3, in conjunction with FIGURES 1 and 2, the first resistance grid R1 will be described in detail. This will fully define the structure of the second, third and fourth resistance grids R2, R3 and R4, since all of these grids are substantially identical.

The grid R1 is comprised of a continuous predetermined length of electrical resistance material 16 in the form of metal foil, wire, or the like. The grid R1 commences at a first inner terminal 18 and proceeds in a serpentine manner through a series of equally spaced concentric arcs 20 each subtending substantially ninety degrees (90°) to its termination at a second outer terminal 22 on the same radius from the axial reference point 14 as the first inner terminal 18.

As shown in phantom lines, the coordinate axes X and Y, horizontal and vertical, respectively, coincide with the outermost points of reversal 24 of the resistance material 16 between each of the concentric arcs 20.

When all of the resistance grids R1–R4 are assembled on the base member 12, as shown in FIGURE 1, the adjacent points of reversal 24 of each of said grids are in staggered relationships with those of the adjacent grid.

The resistance grids R1–R4 are mutually insulated one from the other, by any suitable means.

The length of the resistance material 16 of each resistance grid is substantially identical in each of the said grids, the prime criterion being that the electrical resistance between the inner terminal 18 and outer terminal 22 of each grid is identical.

Figure 4:
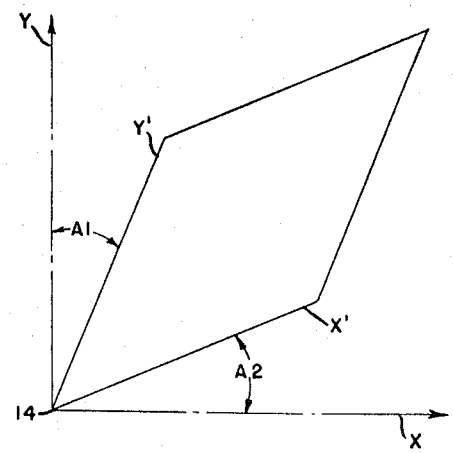
FIGURE 4 is a diagram on a Cartesian coordinate system illustrating the phenomenon of shear strain.

Referring now to FIG. 4, shear strain is defined as the sum of the angles resulting from a deformation, i.e., the angular displacement of the X and Y axes in an unstressed condition to the positions X' and Y' as shown, for a stressed condition. The angle Y–14–Y', hereinafter designated A1, and the angle X–14–X', hereinafter designated A2, are the resulting angles of deformation.

The effect of a strain deformation on the resistance grids R1–R4 is exemplified with reference to FIGURE 3 and the first resistance grid R1.

For example, the length of one of the arcuate portions $20_i$ of the grid R1 (at a radius $r_i$ from the axial reference 14) is defined as $$l_i = r_i \frac{\pi}{2} \quad (I)$$

If a deformation of the gauge 10 occurs, caused by deformation of the member M, the base member 12 and the resistance grid R1 are deformed, the resulting change in the length of the same arcuate portion $20_i$ is $$l_i' = (r_i + dr_i)\left(\frac{\pi}{2} - g\right) \quad (II)$$

where $dr_i$ = mean change in $r_i$ due to normal strains and $g = (A1 + A2)$, the shear strain to be measured.

Thus, $$l_i' = r_i \pi/2 - r_i g + dr_i \frac{\pi}{2} - dr_i g \quad (III)$$

Substituting Equation I into Equation III and solving for the change in length of the arcuate portion $20_i$ yields $$l_i' - l_i = -r_i g + dr_i \pi/2 - dr_i g \quad (IV)$$

The total change in the length of resistance material 16 in the grid R1 is $$\Delta l = \sum_{i=1}^{n}\left(-r_i g + dr_i \frac{\pi}{2} - dr_i g\right) \quad (V)$$

where $n$ = number of arcuate portions 20 in resistance grid R1.

The gauge factor (GF) which defines the change in electrical resistance (R) of the grid R1 due to the change in length of the resistance material 16, is defined as $$GF = \Delta R/R/\Delta l/l \quad (VI)$$

and it is obvious from Equation VI that $\Delta l$ of the grid R1 may be expressed as $$\Delta l = K \Delta R \quad (VII)$$

where $$K = l/(GF)(R)$$

Equation V indicates that the change in length of the grid R1 may be expressed as $$\Delta l = \Delta l_g + \Delta l_{dr} \quad (VIII)$$

Equations VII and VIII indicate that the change in resistance of the grid R1 may be expressed as $$\Delta R = \frac{\Delta l_g + \Delta l_{dr}}{K} \quad (IX)$$

Equation IX indicates that the change in resistance R of the grid R1 may be expressed as $$\Delta R = \Delta R_g + \Delta R_{dr} \quad (X)$$

Figure 5:
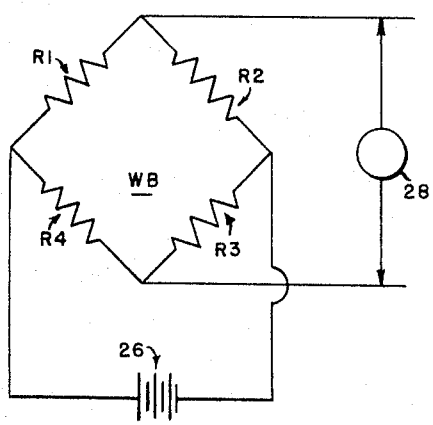
FIGURE 5 is a schematic diagram of a circuit for the utilization of the strain gauge of FIGURE 1.

Referring next to FIGURE 5, the resistance grids R1–R4 of the gauge 10 are shown connected in a Wheatstone bridge configuration WB, one grid in each bridge arm, with a battery source 26 across one diagonal and a galvanometer 28 or the like across the other diagonal.

With the change in resistance of the grids R1, R2, R3 and R4 being designated $\Delta R1$, $\Delta R2$, $\Delta R3$ and $\Delta R4$, respectively, and the respective grid designations being used to designate the unstressed resistance values thereof, the equation for balance in the bridge WB in an unstrained state is $$R1 \times R3 = R2 \times R4 \quad (XI)$$

and for a strained state is $$(R1 + \Delta R1_g + \Delta R1_{dr})(R3 + \Delta R3_g + \Delta R3_{dr}) \quad (XII)$$
$$\neq (R2 + \Delta R2_g + \Delta R2_{dr})(R4 + \Delta R4_g + \Delta R4_{dr})$$

Now, if $$R1 = R2 = R3 = R4 \quad (XIII)$$

and since for the normal strain $$\Delta R1_{dr} = \Delta R2_{dr} = \Delta R3_{dr} = \Delta R4_{dr} \quad (XIV)$$

and since for the shear strain $$\Delta R1_g = \Delta R3_g = -\Delta R2_g = -\Delta R4_g \quad (XV)$$

it is obvious that the inequality sign in Equation XII is valid and the output signal from the bridge WB is a function only of the shear strain $(g)$.

Therefore, the strain gauge 10 is truly a shear strain $(g)$ responsive strain gauge.

In operation, referring to FIGURES 1, 2 and 5, the base membrane 12 of the strain gauge 10 is bonded or glued to the surface SM of an elastic member M over a point where the shear strain is to be measured and the bridge circuit WB is balanced.

The member M is stressed and its surface SM distorts, effecting distortion in the base membrane 12 and a change in the length of resistance material 16 in the resistance grids R1–R4, the resulting change in resistance of the grids R1–R4 effects an unbalance in the bridge circuit WB.

The unbalance in the bridge circuit WB effects an output voltage signal across the bridge diagonal containing the galvanometer 28 which is directly proportional to the shear strain $(g)$ detected by the gauge 10.

Figure 6:
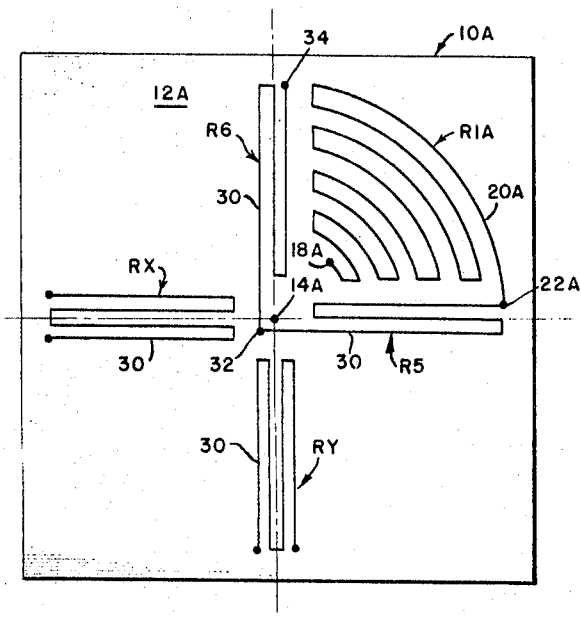
FIGURE 6 is a top plan view of a second embodiment of a shear strain responsive strain gauge of the present invention including elements responsive to normal strains.

Referring now to FIGURE 6, another embodiment of shear strain responsive strain gauge 10A is shown as including only one quadrant grid R1A and four axially disposed normal strain sensing, serpentine, rectilinear resistance grids R5, R6, RX and RY of continuous rectilinearly disposed parallel resistance strips 30, on a base membrane 12A.

The rectilinear resistance grids R5 and R6 are on the X and Y axes, respectively, bounding the quadrant containing the quadrant grid R1A.

The rectilinear grid R5 has one end connected to the outer terminal 22A of the quadrant grid R1A and its other end connected at a common terminal 32 with the rectilinear grid R6. The other end of the rectilinear grid R6 comprises a terminal 34.

Figure 7:
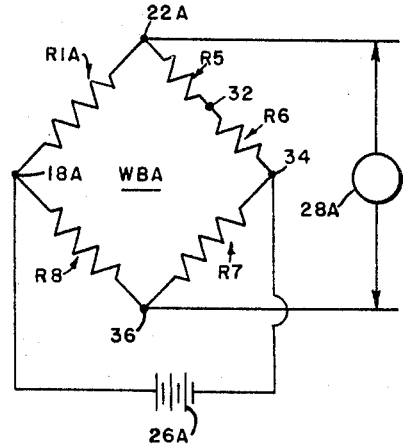
FIGURE 7 is a schematic diagram of a circuit for the utilization of the strain gauge of FIGURE 6.

Referring to FIGURE 7, the gauge 10A is connected in a Wheatstone bridge configuration WBA having the quadrant grid R1A as one bridge arm, the rectilinear grids R5 and R6 in series as another adjacent bridge arm. The rectilinear grids RX and RY are for direct measurement of normal strains $\epsilon_x$ and $\epsilon_y$ and are not connected in the bridge circuit WBA. Standard resistances R7 and R8 having a common terminal 36 are connected, respectively, at their opposite ends to the gauge terminals 34 and 18A and form the other arms of the bridge circuit WBA.

A battery source 26A is connected across the terminals 18A and 34 and a galvanometer 28A is connected across the terminals 22A and 36.

The balance equation for the bridge circuit WBA for an unstrained state is $$(R1A)R7 = (R5 + R6)R8 \quad (XVI)$$

When the gauge 10A is subjected to a strained state, the bridge equation is $$(R1A + \Delta R1A\epsilon_x + \Delta R1A\epsilon_y + \Delta R1A_g)R7 \quad (XVII)$$
$$\neq (R5 + \Delta R5\epsilon_x + R6 + \Delta R6\epsilon_y)R8$$

Since the single quadrant grid R1A is not fully effective at every point in measuring the normal strains, it should be longer than the normal strain responsive elements R5 and R6. Thus, for materials of the same resistivity, in the respective grids, the resistance may be expressed as $$R1A = KR5 = KR6 \quad (XVIII)$$

where K is a predetermined constant greater than one (1), so that the effect of normal strain will result in $$\Delta R1A_{\epsilon_x} = \Delta R5_{\epsilon_x} \quad (XIX)$$

and $$\Delta R1A_{\epsilon_y} = \Delta R6_{\epsilon_y} \quad (XX)$$

Then, if $$R7 = R8 \quad (XXI)$$

and $$R5 = R6 \quad (XXII)$$

and, in view of Equations XIX–XXII, Equation XVII reduces to $$\Delta R1A_g \neq R5(2-K) \quad (XXIII)$$

This inequality is valid and the configuration R1A–R5–R6 of FIGURE 6 is a shear strain responsive strain gauge with the gauge 10A having the additional capability of direct measurement of normal axial strains $\epsilon_x$ and $\epsilon_y$.

Equation XXIII shows that the output of the bridge circuit WBA across its terminals 22A and 36 to the meter 28A is a function only of the shear strain ($g$) and the constants R5 and K.

It should be noted that the condition imposed by Equation XVIII results in the cancellation in Equation XVII of the normal strain effects. This requires Equation XVI to take the form $$(R1A)R7 \neq (R5+R6)R8 \quad (XXIV)$$

Thus, Equation XXIV implies that for the unstrained state of the gauge 10A, the bridge WBA will not be in balance. Therefore, it is necessary for the readout meter 28A to be calibrated or biased to preclude readout of the initial unbalanced condition of the bridge WBA for the unstrained state.

Figure 9:
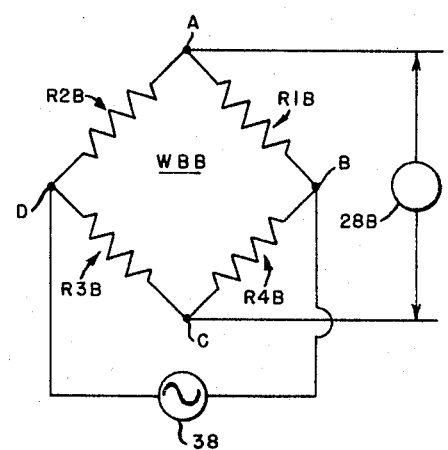
FIGURE 9 is a schematic diagram of a circuit for the utilization of the strain gauge of FIGURE 8.
Figure 8:
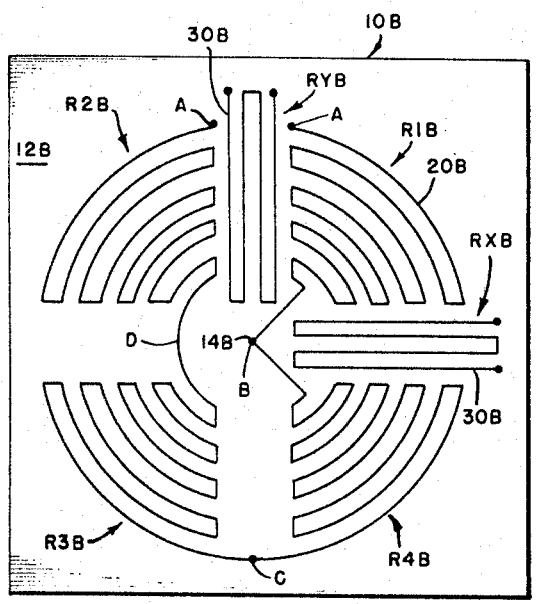
FIGURE 8 is a top plan view of a third embodiment of a shear strain and normal strain responsive strain gauge of the present invention.

Referring to FIGURES 8 and 9, a third embodiment of the present invention is shown as a shear strain responsive strain gauge 10B with four quadrant resistance grids R1B, R2B, R3B and R4B and normal strain responsive, axially disposed resistance grids RXB and RYB. In this embodiment, the axial grids RXB and RYB are shown to one side or the other of the axial reference 14B, but it is to be understood that translation of these axial grids along their respective axes is an equivalent structure.

In both FIGURES 8 and 9, like parts to the previous embodiments bear like numerals with the suffix B.

The first and second quadrant grids R1B and R2B have common outer terminals A; the first and fourth quadrant grids R1B and R4B have a common inner terminal B which coincides in FIGURE 8 with the location of the axial reference 14B; the third and fourth quadrant grids R3B and R4B have a common outer terminal C; and the second and third quadrant grids R2B and R3B have a common inner terminal D. These terminals (A, B, C, D) comprise the four diagonal terminals of the Wheatstone bridge circuit WBB of FIGURE 9.

The readout meter 28B is connected across the terminals A and C of the bridge WBB.

Power is supplied to the bridge WBB by an alternating current source 38 across the terminals B and D.

The embodiment of FIGURES 8 and 9 is a combined shear strain responsive-normal strain responsive strain gauge, with the bridge circuit WBB responsive only to shear strain and illustrating that the battery source 26 of FIGURE 5 is readily substituted by an alternating current source 38.

Equations I–XV as applied to the quadrant grids R1–R4 and the bridge circuit WB of FIGURES 1 and 5, respectively, are thus applicable to the embodiments of FIGURES 8 and 9.

In operation, which is similar in all embodiments, the embodiments of FIGURES 1–5 and 8–9 provide a readout on the order of magnitude of four (4) times that of the shear strain readout of the embodiments of FIGURES 6–7.

It can readily be seen from the foregoing specification and drawings that the present invention satisfies a long felt need in the art for a strain gauge which is directly responsive to shear strain and has sufficient versatility to effect direct measurement thereof by circuits adapted to either A.C. or D.C. energization.

Further, the size of any given strain gauge of the present invention is not critical to its operation and may be readily changed to adapt it to the environmental parameters of a particular use thereof.

While only several specific embodiment are hereinbefore illustrated and described, it is to be expressly understood that this invention is not intended to be limited to the exact formations, construction or arrangement of parts as illustrated and described because various modifications may be developed in putting the invention to practice within the scope of the appended claims.

This is a continuation-in-part of co-pending application for patent, Ser. No. 616,640, filed Feb. 16, 1967.

What is claimed is:

1. A shear strain responsive strain gauge structure comprising an elastic membrane having a surface area defined by a pair of orthogonally related, intersecting, coordinate axes, defining quadrants on said surface axes, first electrical resistance grid means affixed to said surface of said membrane disposed in and substantially subtending one of said quadrants, said resistance grid means including a continuous, elongated, electrical resistance element extending from a predetermined inner point in said quadrant to a predetermined outer point in said quadrant in symmetrically spaced, concentric circular paths; and second continuous electrical resistance grid means connected in circuit with said first electrical resistance grid means and symmetrically affixed to said surface area of said membrane about said one of said quadrants; said first and second grid means, comprising arms of a Wheatstone bridge circuit and being so shaped and so proportioned as to exhibit a change in resistance in such bridge circuit in direct proportion to shear strain.

2. The invention defined in claim 1, wherein said second electrical resistance grid means comprises first and second axially disposed resistance grid portions bounding said one of said quadrants and connected in series with said first electrical resistance grid means, said axially disposed resistance grid portions each comprising substantially equal-valued, continuous, elongated, electrical resistance elements affixed to said surface and symmetrically disposed over a respective one of said axes in rectilinear parallel paths.

3. The invention defined in claim 2, wherein said gauge structure further includes third and fourth axially disposed resistance grid means, independent from the other of said grid means, comprising, respectively, continuous elongated electrical resistance elements affixed to said surface and symmetrically disposed in parallel equally spaced paths, one on each of said coordinate axes, whereby said gauge structure is rendered additionally responsive to normal strain.

4. The invention defined in claim 1, wherein said second continuous electrical resistance grid means comprises three electrical resistance grid means, each substantially identical with said first grid means, located one in each of the other of said quadrants on said surface area and affixed to said surface.

5. The invention defined in claim 1, wherein said gauge structure further includes first and second axially disposed resistance grid means, independent of the other of said grid means, comprising, respectively, continuous elongated electrical resistance elements affixed to said surface and symmetrically disposed in parallel equally spaced paths, one on each of said coordinate axes, whereby said gauge structure is rendered additionally responsive to normal strain.

6. The invention defined in claim 4, wherein said gauge structure includes first and second axially disposed resistance grid means, independent of the other of said grid means, comprising, respectively, continuous elongated electrical resistance elements affixed to said surface and symmetrically disposed in parallel equally spaced paths, one on each of said coordinate axes, whereby said gauge structure is rendered additionally responsive to normal strain.

7. Shear strain responsive strain gauge means and circuit means providing direct readout of shear strain, comprising an elastic membrane having a surface area defined by a pair of orthogonally related, intersecting, coordinate axes defining quadrants on said surface area, electrical resistance grid means disposed one in each of said quadrants and each substantially subtending its respective quadrant, each said resistance grid means comprising a continuous, elongated, electrical resistance element extending from a predetermined inner circuit terminal point in its said respective quadrant to a predetermined outer circuit terminal point in its said quadrant in symmetrically spaced concentric, circular paths, means connecting said circuit terminal points effecting a Wheatstone bridge circuit having each of said electrical resistance grid means comprising an arm of said bridge, power means connected across predetermined ones of said circuit terminal points, and electrical readout means connected across other predetermined ones of said circuit terminal points.

8. Shear strain responsive strain gauge means and circuit means providing direct readout of shear strain, comprising an elastic membrane having a surface area defined by a pair of orthogonally related, intersecting, coordinate axes defining quadrants on said surface area, electrical resistance grid means disposed in one of said quadrants and substantially subtending same, said electrical resistance grid means comprising a continuous elongated, electrical resistance element extending from a predtermined inner terminal point in said quadrant to a predetermined outer terminal point in said quadrant in symmetrically spaced concentric, circular paths, first and second axially disposed resistance grid means bounding said quadrant and connected in series with the other said electrical resistance grid means, said axially disposed grid means each comprising substantially equal-valued, continuous, elongated, electrical resistance elements symmetrically disposed over a respective one of said axes in rectilinear parallel paths, means including first and second standard resistance means connecting said other grid means and said axially disposed first and second grid means in a Wheatstone bridge circuit as first and second arms of said bridge, respectively, said first and second standard resistance means comprising third and fourth arms of said bridge, respectively, said bridge having common terminals between adjacent arms thereof, power means connected across predetermined ones of said common terminals, and electrical readout means connected across other predetermined ones of said common terminals.

9. As an article of manufacture, a shear strain responsive strain gauge structure comprising an elastic membrane having a surface area defined by a pair of orthogonally related, intersecting, coordinate axes defining quadrants on said surface area, electrical resistance grid means disposed in one of said quadrants and substantially subtending same, said electrical resistance grid means comprising a continuous elongated, electrical resistance element extending from a predetermined inner terminal point in said quadrant to a predetermined outer terminal point in said quadrant in symmetrically spaced, concentric, circular paths, first and second axially disposed resistance grid means bounding said quadrant and connected in series with the other said electrical resistance grid means, said axially disposed grid means each comprising substantially equal-valued, continuous, elongated, electrical resistance elements symmetrically disposed over a respective one of said axes in rectilinear parallel paths.

10. As an article of manufacture, a shear strain gauge structure comprising an elastic membrane having a surface area defined by a pair of orthogonally related, intersecting, coordinate axes defining squadrants on said surface area, electrical resistance grid means fixed to said surface area of said membrane, substantially subtending each of said quadrants, and being comprised of continuous, elongated, electrical resistance element means extending from a predetermined inner point to a predetermined outer point in each said quadrant in symmetrically spaced, concentric, circular, paths.

11. The invention defined in claim 10, wherein said continuous, elongated, electrical resistance element means is of substantially equal length and substantially equal electrical resistance in each of said quadrants.

12. The invention defined in claim 10, wherein said electrical resistance grid means includes common terminal connections between adjacent quadrant subtending portions thereof, said common terminal connections defining the diagonal terminal connections of a Wheatstone bridge circuit having each quadrant portion of said resistance grid means as a leg thereof.

13. The invention defined in claim 12, wherein said continuous, elongated, electrical resistance element means is of substantially equal length and substantially equal electrical resistance in each of said quadrants.

References Cited
FOREIGN PATENTS
921,837    3/1963    Great Britain.

RICHARD C. QUEISSER, *Primary Examiner.*

VICTOR J. TOTH, *Assistant Examiner.*

U.S. Cl. X.R.

73—141; 338—2